(12) United States Patent
Legallais et al.

(10) Patent No.: US 7,736,142 B2
(45) Date of Patent: Jun. 15, 2010

(54) BLOW MOULDING MACHINE FOR THE MOULDING OF CONTAINERS, COMPRISING A MOULD BASE WHICH IS BIASED UPWARDS

(75) Inventors: Stephane Legallais, Octeville sur Mer (FR); Jose Blanchard, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 773 days.

(21) Appl. No.: 11/632,041

(22) PCT Filed: Jul. 13, 2005

(86) PCT No.: PCT/EP2005/053342
§ 371 (c)(1),
(2), (4) Date: Jan. 10, 2007

(87) PCT Pub. No.: WO2006/010706
PCT Pub. Date: Feb. 2, 2006

(65) Prior Publication Data
US 2008/0063742 A1    Mar. 13, 2008

(30) Foreign Application Priority Data
Jul. 20, 2004  (FR) .................................. 04 51588

(51) Int. Cl.
*B29C 49/36* (2006.01)
*B29C 49/56* (2006.01)

(52) U.S. Cl. ...................... 425/529; 425/540; 425/541; 425/451.4

(58) Field of Classification Search ................. 425/522, 425/525, 529, 540, 541, 451.4, DIG. 5
See application file for complete search history.

(56) References Cited

U.S. PATENT DOCUMENTS 4,141,680 A * 2/1979 Kauffman et al. ........... 425/529

FOREIGN PATENT DOCUMENTS

| DE | 102 12 896 | 10/2003 |
| FR | 2 841 495 | 1/2004 |
| FR | 2 843 714 | 2/2004 |

* cited by examiner

*Primary Examiner*—Robert B Davis
(74) *Attorney, Agent, or Firm*—Young & Thompson

(57) ABSTRACT

A blow moulding machine (10) for the manufacture of containers based on preforms, includes at least one rotating turntable (12) furnished with a console (16) supporting two half-moulds (20, 22) that are designed to form the body of the container and a mould base (32) that is designed to form the bottom of the container, of the type in which the mould base (32) is driven so as to slide vertically by a cam system (46), characterized in that the console (16) includes at least one return member that forces the mould base (32) towards its top position, and in that the cam system (46) includes a cam follower element (52) that is slidingly connected to the mould base (32) and that interacts with a control surface (54) oriented downwards.

10 Claims, 3 Drawing Sheets

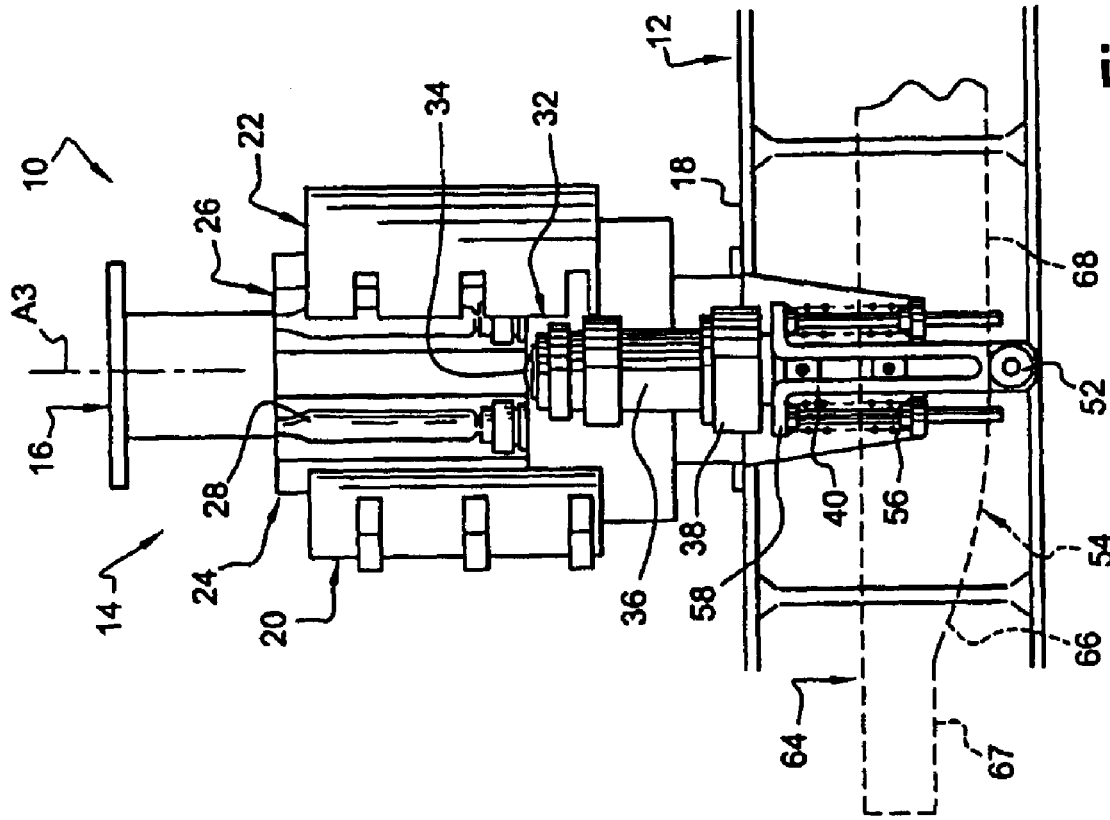
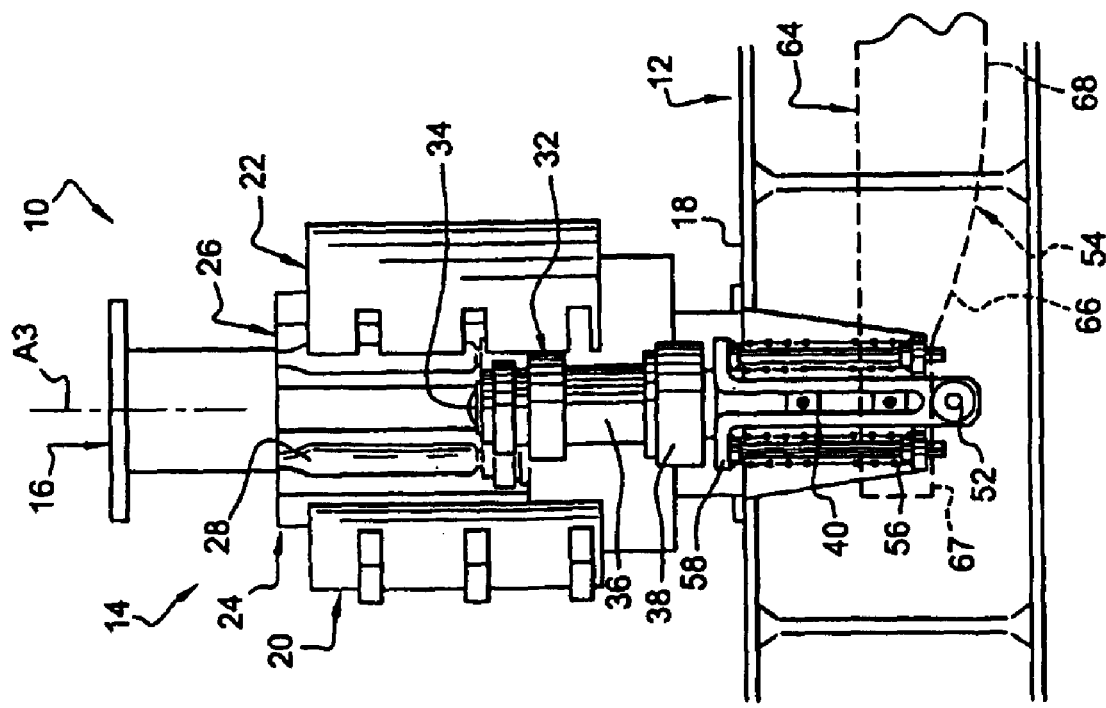

BLOW MOULDING MACHINE FOR THE MOULDING OF CONTAINERS, COMPRISING A MOULD BASE WHICH IS BIASED UPWARDS

The present invention relates to a blow moulding machine for the manufacture of containers.

The present invention relates more particularly to a blow moulding machine for the manufacture of containers based on preforms made of thermoplastic by blow moulding or stretch-blow moulding, comprising at least one plate that is mounted so as to rotate about a substantially vertical axis and that supports at least one console, of the type in which the console supports two half-moulds that are designed to form the body of the container and a mould base that is designed to form the bottom of the container, of the type in which the two half-moulds are mounted so as to be movable relative to one another between a closed position suitable for moulding and an open position suitable for stripping and loading a preform, of the type in which the mould base is driven so as to slide relative to the console, in a sliding direction substantially parallel to the axis of rotation, by a cam system between a top position suitable for moulding and a bottom position suitable for stripping, and of the type in which the mould base is designed to be nested in the half-moulds when it occupies its top position and when the half-moulds occupy their closed position.

For blow moulding or stretch-blow moulding containers such as bottles based on heated preforms made of thermoplastic such as polyethylene terephthalate (PET), it is a known practice to use moulds consisting of two half-moulds that can be moved relative to one another.

The half-moulds can be moved between an open position that corresponds to an operation of loading the mould with a preform or to an operation of stripping the mould by removing the bottle obtained by the moulding operation, and a closed position that corresponds to a moulding operation.

It is a known practice to arrange the two half-moulds so that they can be rotated relative to one another, which corresponds to moulds of the jack-knife type. Such a type of mould is described in particular in document FR-A-2,653,058.

The mould can be made in only two half-moulds when the container to be manufactured has a relatively simple shape and can be easily extracted from the mould. This is the case in particular when the bottom of the container has no pronounced reliefs, for example when it comprises a convex hemispherical bottom or a flat bottom.

The actuation of the two half-moulds on closing and opening is controlled mechanically, with the aid of a roller, fixedly attached to the half-moulds by transmission means that interact with a cam placed laterally and having a required profile. Frequently it is an assembly of several moulds mounted on a common rotating support, called a carousel, and the cam is mounted laterally attached.

On the other hand, when, as happens in the majority of cases, the bottom has a complex shape, for example when the bottom has a petal-like shape or a concave dome shape, the container cannot be extracted, without deformation and hence without damage, from a two-part mould. This is why use is made, for the manufacture of such containers furnished with a complex-shaped bottom, of three-part moulds, comprising two half-moulds that can be moved relative to one another for moulding the body of the container and a mould base that can be moved axially for moulding the bottom of the container.

Therefore in a conventional manner, the actuation of the mould base is assigned to a cam system associated with the mould base that is fitted with a roller interacting with a cam separate from the cam controlling the movement of the half-moulds.

In addition, to strengthen the mould mechanically when it is subjected to the blow moulding pressure, provision has been made for a mechanical fixed attachment of the two half-moulds and of the mould base in the closed position of the mould. Accordingly, the base part of the two half-moulds and the top part of the mould base overlap one another and are fitted with mutually nesting means such as for example an annular peripheral rib that engages in a matching annular groove.

The result of this is that the axial movement of the mould base cannot take place until the two half-moulds are in a sufficiently parted position for which the mutually nested means are disengaged. It is therefore necessary that the movements of the half-moulds and of the mould base take place in a very precise sequence.

These requirements bring with them the need for a strict relative positioning of the two cams controlling respectively the movements of the half-moulds and of the mould base, with the use of adjustment means to ensure the required precision of this relative positioning.

In particular, the top position of the mould base must be determined precisely, so as to prevent the half-moulds from striking the edges of the mould base when they close.

Currently, in the machines of the Applicant, the mould base is mounted slidingly on a vertical runner that is fixedly attached to the support console. The mould base is forced to the bottom position by gravity, while being guided at least in its ascending and descending phases in normal operation by a cam and roller mechanism; furthermore, damping springs may be interposed between the console and the mould base in order to limit the mechanical impacts due to the vibrations when the mould base is in the bottom position.

More precisely, the mould base comprises a roller that interacts alternately with an ascending cam surface and a descending cam surface, the said roller and cam surfaces forming the said cam and roller mechanism. To allow maintenance operations, the cam is not continuous on the periphery of the carousel forming the machine, but is present only in the angular sector of the machine where it is important for the movement of the mould base to be controlled when the machine is operating normally, that is to say the angular sector corresponding to the opening and closing zones of the mould for the operations of unloading a container and loading a preform.

This solution, although having given satisfaction, nevertheless has certain disadvantages, particularly on the occasion of maintenance operations during which the mould bases are naturally positioned in the bottom position when the moulds are opened manually in the angular sector in which the cam is absent, even though placing in the bottom position is of no use, which requires a whole manual, hence awkward, procedure to return each of the moulds to the closed position, a procedure that requires manually raising each mould base, holding it manually in the top position until the associated half-moulds are closed again, then preventing the mould base from descending again.

The invention is designed in particular to remedy these disadvantages by proposing a simple, effective and economical solution.

To this end, the invention proposes a blow moulding machine of the type previously described, characterized in that the console comprises at least one return member that forces the mould base towards its top position, and in that the cam system comprises a cam follower element that is slidingly connected to the mould base and that interacts with a control surface fixed relative to the plate and oriented downwards, so that the cam system moves the mould base towards its bottom position, against the effort exerted by the return member.

According to other features of the invention:

the return member is a compression coil spring;

the mould base is attached to a traveler that is mounted so as to slide in a runner attached to the console;

the mould base is attached to a traveler consisting of a grooved shaft that is mounted so as to slide in a tubular casing attached to the console;

the cam follower element is attached to the traveler;

the control surface comprises a first section that controls the sliding of the mould base to the bottom position and a second section that controls the sliding of the mould base to the top position;

the control surface extends over an angular sector of the circular trajectory of the console, so that the trajectory of the console comprises a main angular sector during which the cam follower element is not in contact with the control surface and a secondary angular sector during which the cam follower element comes into contact with the control surface.

Other features and advantages of the invention will appear on reading the following detailed description for the understanding of which reference will be made to the appended drawings in which:

FIG. 5 is a view similar to that of FIG. 4 that represents schematically the moulding unit when the half-moulds are open and the mould base occupies its top position;

FIG. 6 is a view similar to that of FIG. 4 that schematically represents the moulding unit when the half-moulds are open and the mould base occupies its bottom position.

In the following description, identical, similar or analogous elements will be indicated by the same reference numbers.

FIG. 1 shows a blow moulding machine 10 for the manufacture of containers based on preforms made of thermoplastic by blow moulding or stretch-blow moulding.

The blow moulding machine 10 comprises a rotating turntable 12 forming a support, of generally circular shape, that is mounted so as to rotate about a substantially vertical axis A1 and that is designed to support a series of moulding units 14 distributed circumferentially in an even manner over the periphery of the turntable 12.

In the rest of the description, for the purposes of comprehension, the elements will be called inner or outer, depending on their radial position relative to the axis of rotation A1 of the turntable 12.

In a similar manner, elements will be called radial or transverse when they extend in a generally transverse plane to the axis of rotation A1.

Figure 1:
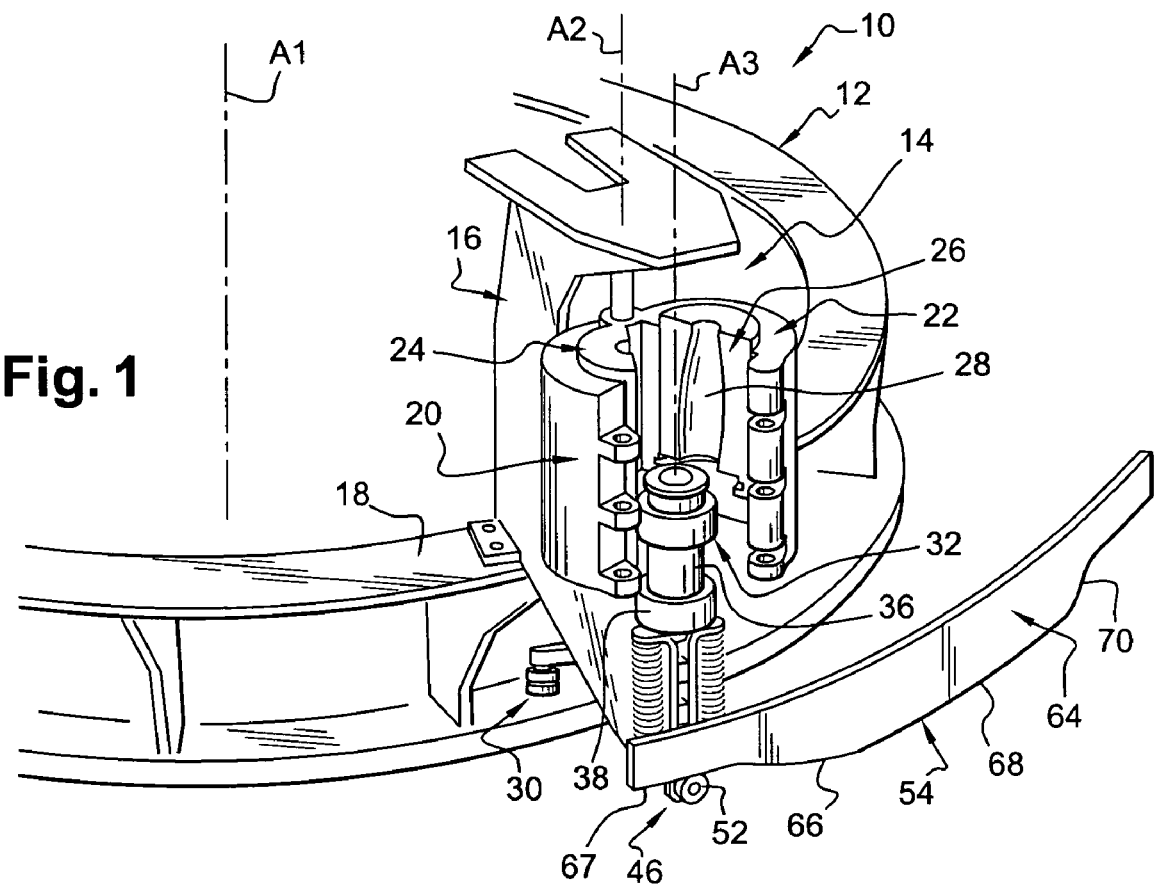
FIG. 1 is a partial view in perspective that represents schematically a blow moulding machine fitted with a moulding unit made according to the teachings of the invention.

To simplify the representation, a single moulding unit 14 has been shown in FIG. 1.

According to the embodiment shown here, each moulding unit 14 comprises a support console 16 that is attached to a top radial face 18 of the turntable 12.

Each moulding unit 14 forms a blow moulding or stretch-blow moulding mould of the jack-knife type that can be used in particular for the manufacture of containers made of plastic such as bottles, flasks or similar elements.

Figure 4:
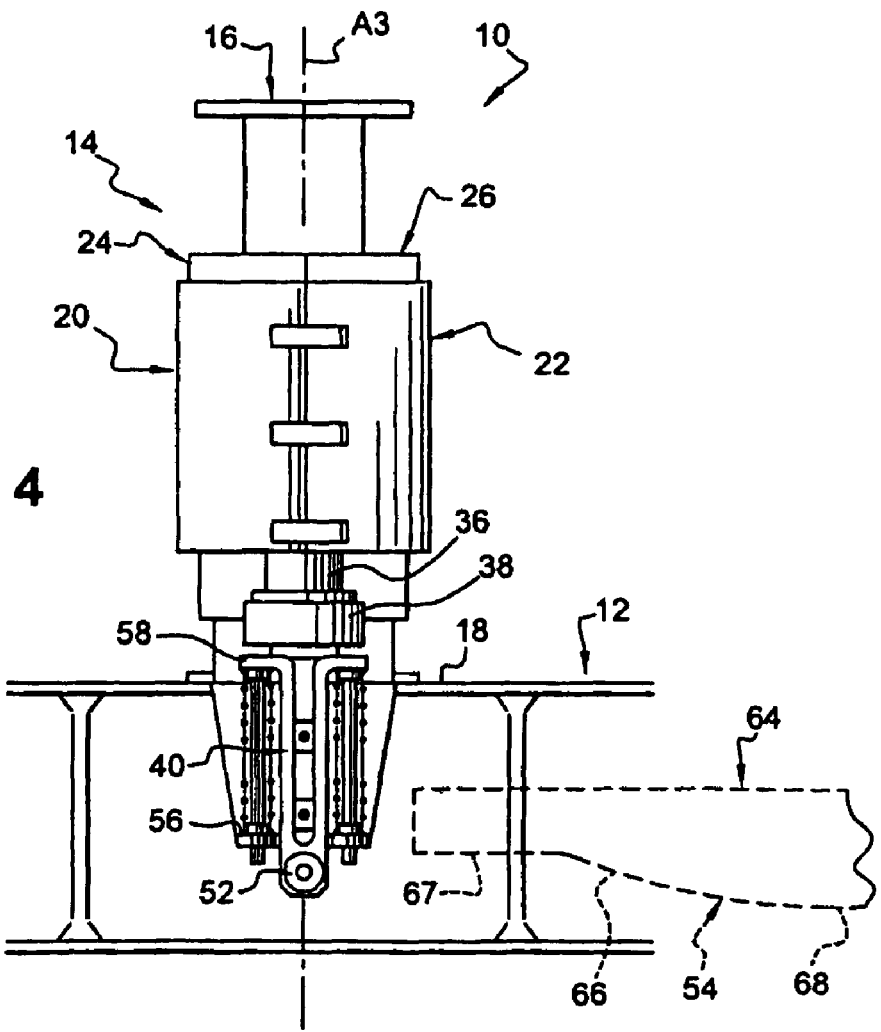
FIG. 4 is a front view that shows schematically the moulding unit in the moulding position.

The moulding unit 14 comprises two half-moulds 20, 22 that are mounted so as to move relative to one another between a closed position suitable for moulding, that is shown in FIG. 4, and an open position suitable for stripping and loading a preform, that is shown in FIG. 6.

The half-moulds 20, 22 here are mounted so as to pivot on the console 16 about one and the same axis A2 substantially parallel to the axis of rotation A1 of the turntable 12.

Each half-mould 20, 22 here supports a half-shell 24, 26 comprising a mould shape 28 that is designed to form by moulding a half of the container body.

In a known manner, the pivoting of the half-moulds 20, 22 is operated by a cam and rollers system of which only the cam follower rollers 30 have been shown, the control surface of the associated cam system not being shown.

The console 16 also supports a mould base 32 comprising, in its top axial end face, a mould shape 34, here convex in shape, designed to form by moulding the bottom of the container.

The mould base 32 is mounted so as to slide relative to the console 16, in a sliding direction A3 substantially parallel to the axis of rotation A1 of the turntable 12.

The mould base 32 here is attached to the top axial end of a spacer 36 that is interposed, in the direction of sliding A3, between the bottom transverse face of the mould base 32 and the top transverse face of a vertical cylinder-shaped disc 38.

The disc 38 is fitted to the top axial end of a traveler 40.

Figure 2:
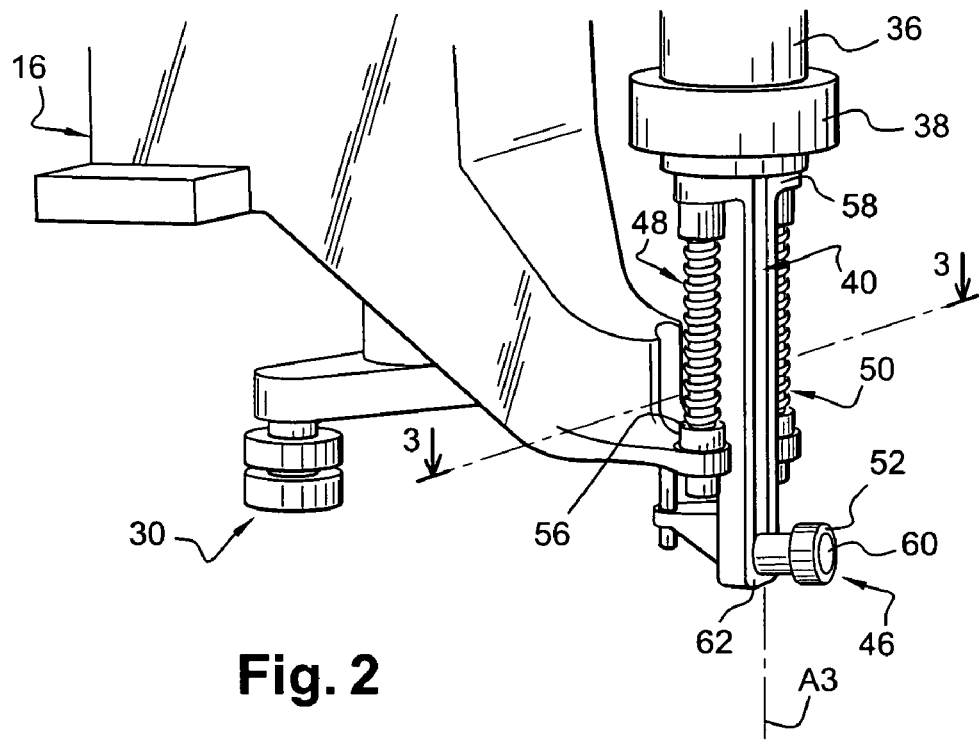
FIG. 2 is a view in perspective that represents partially and schematically the traveler fitted to the moulding unit according to the invention.
Figure 3:
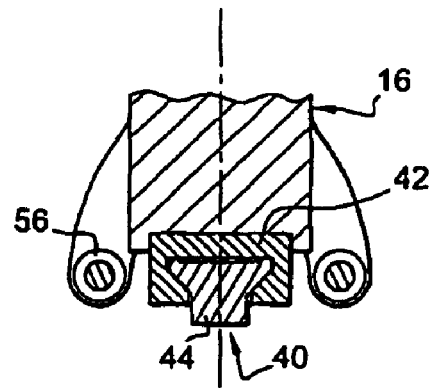
FIG. 3 is a view along the sectional plane 3-3 that represents schematically the traveler of FIG. 2.

As can be seen in FIGS. 2 and 3, the traveler 40 comprises a runner 42 in the shape of a rail that extends in the direction of sliding A3 and that is mounted so as to slide in a matching runner 44 attached to the console 16.

The moulding unit 14 is fitted with a cam system 46 that is designed to move the mould base 32 so as to slide relative to the console 16 between a top position suitable for moulding, that is shown in FIGS. 1, 4 and 5, and a bottom position suitable for stripping and for loading a preform, that is shown in FIG. 6.

The mould base 32 is designed to be fitted into the half-moulds 20, 22 when it occupies its top position and when the half-moulds 20, 22 occupy their closed position. This position called the moulding position is shown in FIG. 4.

It is noted that FIGS. 1 and 5 illustrate an intermediate operating phase during which the half-moulds are open to allow stripping, while the mould base still occupies its top position, which does not allow stripping. This intermediate operating phase immediately precedes the phase during which the mould base descends to its bottom position so as to allow stripping.

According to a first feature of the invention, the console 16 comprises at least one return member 48, 50 that forces the mould base 32 towards its top position.

According to a second feature of the invention, the cam system 46 that moves the mould base 32 comprises a cam follower element 52 that is connected slidingly to the mould base 32 and that interacts with a control surface 54 fixed relative to the turntable 12 and oriented downwards, so that the cam system 46 moves the mould base 32 towards its bottom position, against the force exerted by the return member 48, 50.

According to the embodiment shown here, the console 16 comprises two compression coil springs 48, 50 that form the members for returning the mould base 32 to its top position.

Each spring 48, 50 is interposed axially (A3) between a radial bearing surface 56, that is oriented upwards and that is arranged in the console 16, and a bearing cup 58 opposite that is arranged on the traveler 40.

The cam follower element here consists of a roller 52 that is mounted so as to rotate freely about a shaft 60 that extends radially outwards, relative to the axis of rotation A1 of the turntable 12. The shaft 60 is attached to a bottom end portion 62 of the traveler 40.

Figure 2A:
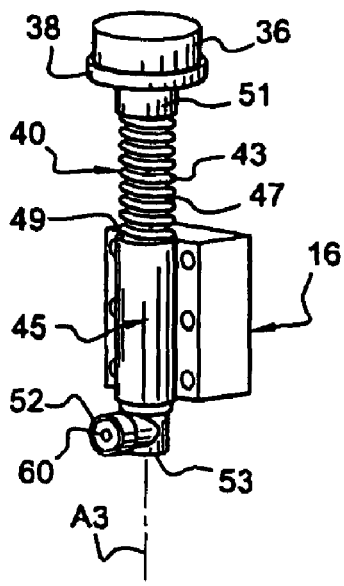
FIG. 2a is a view similar to that of FIG. 2 that represents a variant embodiment of the traveler.

According to a variant embodiment that is shown in FIG. 2a, the traveler 40 consists of a grooved shaft 43 that is mounted so as to slide along the axis A3 in a tubular casing 45 with balls attached to the console 16.

The console 16 comprises a single return spring 47, coaxial with the grooved shaft 43, that is interposed axially (A3) between a radial bearing surface 49, arranged at the top axial end of the tubular casing 45, and a bearing cup 51 opposite that is arranged here at the top axial end of the grooved shaft 43.

The shaft 60 supporting the roller 52 is arranged here at the bottom axial end 53 of the grooved shaft 43, on the side of the bottom axial end of the tubular casing 45.

This variant embodiment has the advantage of simplifying the structure of the traveler 40 and the structure of the console 16 by minimizing the number of parts necessary, which makes it possible to reduce the costs and total weight of the blow moulding machine 10.

The control surface 54 of the cam system 46 here has the shape of a rolling track arranged on the bottom axial end edge of a fixed axial plate 64. The fixed axial plate 64 comprises, in a radial plane, a profile in the form of a circular arc centred generally on the axis of rotation A1 of the turntable 12, so as to follow the trajectory of the console 16, when the turntable 12 is rotated.

The control surface 54 is oriented downwards, and it comprises a first inclined section 66 that is designed to move the mould base 32 from its top position to its bottom position, an intermediate, substantially flat section 68, that is designed to keep the mould base 32 in its bottom position, and a second inclined section 70 that is designed to move the mould base 32 from its bottom position to its top position.

Note that the second inclined section 70 serves to control the return force exerted by the springs 48, 50 on the mould base 32 to allow the mould base 32 to rise progressively to its top position.

Advantageously, the control surface 54 extends over an angular sector of the circular trajectory of the console 16, so that the trajectory of the console 16 comprises a main angular sector during which the roller 52 is not in contact with the control surface 54 and a secondary angular sector during which the roller 52 comes into contact and interacts with the control surface 54.

Preferably, the top position of the mould base 32 is determined by an axial abutment (not referenced) that can be adjusted in height.

According to the embodiment shown here, the control surface 54 comprises a substantially flat section 67 that precedes the first inclined section 66, according to the trajectory of the moulding unit 14. The roller 52 therefore comes into contact with the flat section 67, the mould base 32 occupying its top position, before travelling over the first inclined section 66 that moves the mould base 32 downwards.

One advantage of the blow moulding machine 10 according to the invention is that the adjustment of the top position of the mould base 32 is made easier, compared with a machine according to the prior art, since the top position corresponds to a stable rest position of the mould base 32, determined by the axial abutment, and the mould base 32 is held in this stable rest position by its springs 48, 50.

Therefore, unlike a machine according to the prior art, to adjust the top position does not require the use of a tool that compresses the return springs 48, 50, in order to keep the mould base 32 in the top position, the springs 48, 50 here naturally holding the mould base 32 in the top position.

During the majority of the circular trajectory of the console 16, the mould base 32 occupies its top position. Thanks to the invention, in the top position, the mould base 32 exerts no axial force on the half-moulds 20, 22 since it occupies its stable rest position, which minimizes wear on the nesting interface between the mould base 32 and the half-moulds 20, 22.

Another advantage of the blow moulding machine 10 according to the invention is that, during maintenance operations, the mould bases remain in the top position when the moulds are open while the roller 52 is in an angular sector in which it is no longer in contact with the control surface 54: it then becomes possible to reduce the duration of these operations, since there is no longer the need always to return to position the mould bases associated with moulds that have been opened in this angular sector; furthermore, it becomes possible to lower only those of the mould bases that require to be lowered, which automatically reascend as soon as they are released, which considerably helps with the maintenance operations.

The invention claimed is:

1. Blow moulding machine (10) for the manufacture of containers based on preforms made of thermoplastic by blow moulding or stretch-blow moulding, comprising at least one turntable (12) that is mounted so as to rotate about a substantially vertical axis (A1) and that supports at least one console (16), of the type in which the console (16) supports two half-moulds (20, 22) that are designed to form the body of the container and a mould base (32) that is designed to form the bottom of the container, of the type in which the two half-moulds (20, 22) are mounted so as to be movable relative to one another between a closed position suitable for moulding and an open position suitable for stripping and loading a preform, of the type in which the mould base (32) is driven so as to slide relative to the console (16), in a sliding direction (A3) substantially parallel to the axis of rotation (A1), by a cam system (46) between a top position suitable for moulding and a bottom position suitable for stripping, and of the type in which the mould base (32) is designed to be nested in the half-moulds (20, 22) when it occupies its top position and when the half-moulds (20, 22) occupy their closed position, characterized in that the console (16) comprises at least one return member (48, 50) that forces the mould base (32) towards its top position, and in that the cam system (46) comprises a cam follower element (52) that is slidingly connected to the mould base (32) and that interacts with a control surface (54) fixed relative to the turntable (12) and oriented downwards, so that the cam system (46) moves the mould base (32) towards its bottom position, against the force exerted by the return member (48, 50).

2. Blow moulding machine (10) according to claim 1, characterized in that the return member (48, 50) is a compression coil spring.

3. Blow moulding machine (10) according to claim 1, characterized in that the mould base (32) is attached to a traveler (40) that is mounted so as to slide in a runner (42) attached to the console (16).

4. Blow moulding machine (10) according to claim 2, characterized in that the mould base (32) is attached to a traveler (40) that is mounted so as to slide in a runner (42) attached to the console (16).

5. Blow moulding machine (10) according to claim 1, characterized in that the mould base (32) is attached to a traveler (40) consisting of a grooved shaft (43) that is mounted so as to slide in a tubular casing (45) attached to the console (16).

6. Blow moulding machine (10) according to claim 2, characterized in that the mould base (32) is attached to a traveler (40) consisting of a grooved shaft (43) that is mounted so as to slide in a tubular casing (45) attached to the console (16).

7. Blow moulding machine (10) according to claim 3, characterized in that the cam follower element (52) is attached to the traveler (40).

8. Blow moulding machine (10) according to claim 4, characterized in that the cam follower element (52) is attached to the traveler (40).

9. Blow moulding machine (10) according claim 1, characterized in that the control surface (54) comprises a first section (66) that controls the sliding of the mould base (32) to the bottom position and a second section (70) that controls the sliding of the mould base (32) to the top position.

10. Blow moulding machine (10) according claim 1, characterized in that the control surface (54) extends over an angular sector of the circular trajectory of the console (16), so that the trajectory of the console (16) comprises a main angular sector during which the cam follower element (52) is not in contact with the control surface (54) and a secondary angular sector during which the cam follower element (52) comes into contact with the control surface (54).

* * * * *